US009011807B2

(12) United States Patent
Mohanan et al.

(10) Patent No.: US 9,011,807 B2
(45) Date of Patent: Apr. 21, 2015

(54) 8-RING SMALL PORE MOLECULAR SIEVE AS HIGH TEMPERATURE SCR CATALYST

(71) Applicants: BASF Corporation, Florham Park, NJ (US); N. E. Chemcat Corporation, Tokyo (JP); Heesung Catalysts Corporation, Kyunggi-Do (KR)

(72) Inventors: Jaya L. Mohanan, Edison, NJ (US); Patrick Burk, Freehold, NJ (US); Michael J. Breen, Erie, PA (US); Barbara Slawski, North Royalton, OH (US); Makoto Nagata, Shizuoka (JP); Yasuyuki Banno, Shizuoka (JP); Eunseok Kim, Kyunggi-Do (KR)

(73) Assignees: BASF Corporation, Florham Park, NJ (US); N. E. Chemcat Corporation, Tokyo (JP); Heesung Catalysts Corporation, Kyunggi-Do (KR)

( * ) Notice: Subject to any disclaimer, the term of this patent is extended or adjusted under 35 U.S.C. 154(b) by 0 days.

(21) Appl. No.: 14/056,175

(22) Filed: Oct. 17, 2013

(65) Prior Publication Data

US 2014/0112854 A1 Apr. 24, 2014

Related U.S. Application Data

(60) Provisional application No. 61/716,078, filed on Oct. 19, 2012.

(51) Int. Cl.
*B01J 29/072* (2006.01)
*B01D 53/56* (2006.01)
*B01D 53/94* (2006.01)
*F01N 3/20* (2006.01)
*F01N 3/28* (2006.01)
*B01J 29/76* (2006.01)

(52) U.S. Cl.
CPC ........... *B01J 29/763* (2013.01); *B01D 53/9418* (2013.01); *F01N 3/208* (2013.01); *B01D 53/94* (2013.01); *B01J 29/76* (2013.01); *F01N 3/20* (2013.01); *Y02T 10/24* (2013.01); *B01D 2255/20738* (2013.01); *B01D 2255/50* (2013.01); *B01D 2258/012* (2013.01)

(58) Field of Classification Search
USPC ............... 502/60, 64, 66, 74, 338; 423/213.2, 423/239.2; 60/274, 299, 301
See application file for complete search history.

(56) References Cited

U.S. PATENT DOCUMENTS

| | | | |
|---|---|---|---|
| 7,645,718 B2 * | 1/2010 | Li et al. | 502/214 |
| 2003/0050182 A1 | 3/2003 | Tran et al. | |
| 2009/0048095 A1 * | 2/2009 | Li et al. | 502/74 |
| 2010/0092361 A1 | 4/2010 | Li et al. | |

(Continued)

OTHER PUBLICATIONS

Metkar et al., "Selective catalytic reduction of NOx on combined Fe-andCu-seolite monolithic catalysts", Applied Catalysis B: Environmental 2012, vol. 111-112, pp. 67-80.

(Continued)

*Primary Examiner* — Timothy Vanoy
(74) *Attorney, Agent, or Firm* — Servilla Whitney LLC; Melanie L. Brown

(57) ABSTRACT

Described is a selective catalytic reduction catalyst comprising an iron-promoted 8-ring small pore molecular sieve. Systems and methods for using these iron-promoted 8-ring small molecular sieves as catalysts in a variety of processes such as abating pollutants in exhaust gases and conversion processes are also described.

20 Claims, 3 Drawing Sheets

(56) References Cited

U.S. PATENT DOCUMENTS

2010/0092362 A1* 4/2010 Li et al. .................. 423/239.2
2010/0267548 A1 10/2010 Andersen et al.
2011/0165052 A1 7/2011 Beutel et al.
2011/0306488 A1* 12/2011 Powers et al. .................. 502/62

OTHER PUBLICATIONS

International Search Report dated Jan. 24, 2014.

* cited by examiner

US 9,011,807 B2

8-RING SMALL PORE MOLECULAR SIEVE AS HIGH TEMPERATURE SCR CATALYST

PRIORITY

This application claims priority to patent application Ser. 61/716,078 filed Oct. 19, 2012.

TECHNICAL FIELD

The present invention pertains to the field of selective catalytic reduction catalysts. More particularly, embodiments of the invention relate to selective catalytic reduction catalysts comprising an 8-ring small pore molecular sieve, and methods of using these catalysts in a variety of processes such as abating pollutants in exhaust gases.

BACKGROUND

Molecular sieves such as zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures have recently found interest in use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Metal-promoted zeolite catalysts including, among others, iron-promoted and copper-promoted zeolite catalysts, for the selective catalytic reduction of nitrogen oxides with ammonia are known. Iron-promoted zeolite beta (U.S. Pat. No. 4,961,917) has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

The synthesis of a zeolite varies according to structure type of the zeolite, but usually, zeolites are synthesized using a structure directing agent, sometimes referred to as a template or organic template) together with sources of silica and alumina. The structure directing agent can be in the form of an organic, i.e. tetraethylammonium hydroxide (TEAOH), or inorganic cation, i.e. $Na^+$ or $K^+$. During crystallization, the tetrahedral silica-alumina units organize around the SDA to form the desired framework, and the SDA is often embedded within the pore structure of the zeolite crystals.

Metal-promoted, particularly copper promoted aluminosilicate zeolites having the CHA structure type and a silica to alumina molar ratio greater than 1, particularly those having a silica to alumina ratio greater than or equal to 5, 10, or 15 and less than about 1000, 500, 250, 100 and 50 have recently solicited a high degree of interest as catalysts for the SCR of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal promoted zeolites described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower, and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Even though the catalysts described in U.S. Pat. No. 7,601,662, exhibit excellent properties, there is always a desire for improved performance in extended or different temperature windows. For example, for some applications improved high temperature (e.g., temperatures exceeding 450° C.) performance of Cu-SS-13 may be desired or required. To meet regulatory standards such as Euro 6 regulations and beyond, improved performance at high temperatures would be desirable.

SUMMARY

A first aspect of the present invention relates to a selective catalytic reduction catalyst comprising an 8-ring small pore molecular sieve promoted with greater than 5 wt. % iron so that the catalyst is effective to catalyze the selective catalytic reduction of nitrogen oxides in the presence of a reductant at temperatures between 200° C. and 600° C.

In one or more embodiments, the iron-promoted 8-ring small pore molecular sieve is selected from the group consisting of iron-promoted zeolite having a structure type selected from AEI, AFT, AFX, CHA, EAB, ERI, KFI, LEV, SAS, SAT, and SAV. In one or more embodiments, the iron-promoted 8-ring small pore molecular sieve has the CHA crystal structure.

In one or more embodiments, the iron-promoted 8-ring small pore molecular sieve having the CHA crystal structure is selected from an aluminosilicate zeolite, a borosilicate, a gallosilicate, a SAPO, an ALPO, a MeAPSO, and a MeAPO.

In one or more embodiments, the iron-promoted 8-ring small pore molecular sieve is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

In one or more embodiments, the iron-promoted 8-ring small pore molecular sieve is an aluminosilicate zeolite having the CHA crystal structure and is selected from iron-promoted SSZ-13 and iron-promoted SSZ-62. In one or more embodiments, the zeolite has a silica to alumina ratio in the range of 5 and 100. In a specific embodiment, the silica to alumina ratio is in the range of 10 to 50.

In one or more embodiments the catalyst includes iron in the range of 5.1 wt. % to 10 wt. %, calculated as $Fe_2O_3$.

Another aspect of the invention pertains to a catalytic article comprising the catalyst described above in a washcoat deposited on a honeycomb substrate. The honeycomb substrate can comprise a wall flow filter substrate or a flow through substrate.

Another aspect of the invention pertains to an exhaust gas treatment system comprising the catalytic article described above disposed downstream from a diesel engine and an injector that adds a reductant to an exhaust gas stream from the engine.

Another aspect of the invention pertains to a method for selectively reducing nitrogen oxides, the method comprising contacting a gaseous stream containing nitrogen oxides with a selective catalytic reduction catalyst comprising an 8-ring small pore molecular sieve promoted with greater than 5 wt. % iron to catalyze the selective catalytic reduction of the nitrogen oxides in the presence of a reductant at temperatures between 200° and 600° C. In specific embodiments of the method, the 8-ring small pore molecular sieve promoted with iron is selected from the group consisting of AEI, AFT, AFX, CHA, EAB, ERI, KFI, LEV, SAS, SAT, and SAV. In a more specific method embodiment, the 8-ring small pore molecular sieve promoted with iron has the CHA crystal structure. In even more specific method embodiments, the 8-ring small pore molecular sieve promoted with iron and having the CHA crystal structure is selected from the group consisting of aluminosilicate zeolite, SAPO, ALPO and MeAPO.

In specific method embodiments, the 8-ring small pore molecular sieve promoted with iron and having the CHA crystal structure is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6. In more specific method embodiments, the 8-ring small pore molecular sieve promoted with iron and having the CHA crystal structure is an aluminosilicate zeolite. In even more specific method embodiments, the aluminosilicate zeolite is selected from SSZ-13 and SSZ-62.

DETAILED DESCRIPTION

Figure 1:
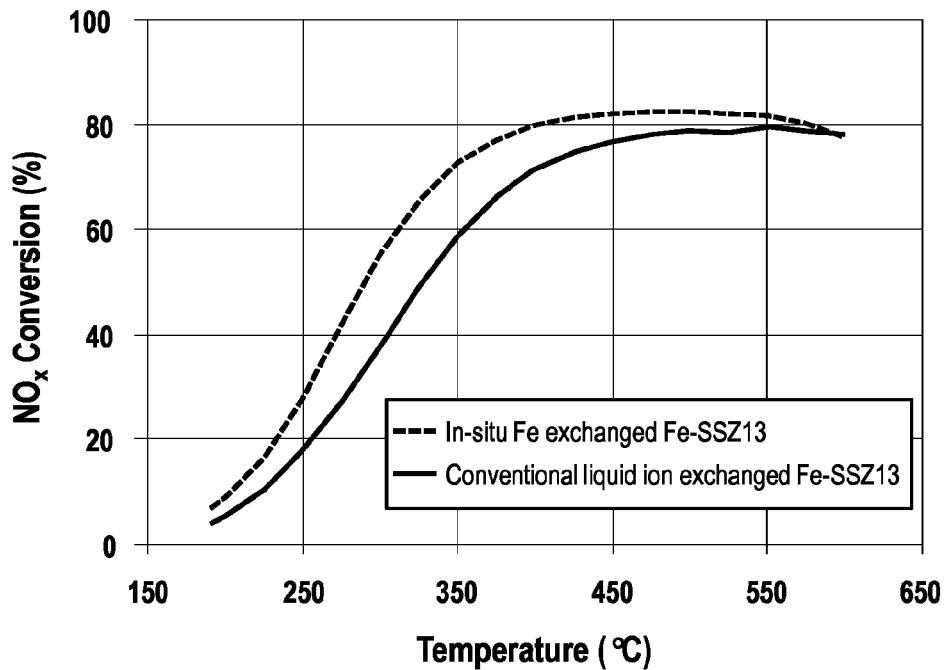
FIG. 1 shows $NO_x$ conversion versus temperature for two different Fe-SSZ-13 samples.

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to catalysts including molecular sieves, methods for their preparation, catalytic articles, exhaust gas systems and methods for abating pollutants from exhaust gases using the catalysts.

With respect to the terms used in this disclosure, the following definitions are provided. As used herein, molecular sieves refer to materials based on an extensive three-dimensional network of oxygen ions containing generally tetrahedral type sites and having a pore distribution. A zeolite is a specific example of a molecular sieve, further including silicon and aluminum. Reference to a "non-zeolite-support" or "non-zeolitic support" in a catalyst layer refers to a material that is not a molecular sieve or zeolite and that receives precious metals, stabilizers, promoters, binders, and the like through association, dispersion, impregnation, or other suitable methods. Examples of such non-zeolitic supports include, but are not limited to, high surface area refractory metal oxides. High surface area refractory metal oxide supports can comprise an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

As used herein, the term "catalyst" refers to a material that promotes a reaction. As used herein, the phrase "catalyst composition" refers to a combination of two or more catalysts, for example a combination of two different materials that promote a reaction. The catalyst composition may be in the form of a washcoat. As used herein, the term "carrier" refers to a support that carries or supports a catalytic species such as a catalyzed honeycomb substrate.

As used herein, the term "substrate" refers to the monolithic material onto which the carrier is placed, typically in the form of a washcoat containing a plurality of carriers having catalytic species thereon. A washcoat is formed by preparing a slurry containing a specified solids content (e.g., 30-90% by weight) of carriers in a liquid vehicle, which is then coated onto a substrate and dried to provide a washcoat layer.

As used herein, the term "washcoat" has its usual meaning in the art of a thin, adherent coating of a catalytic or other material applied to a substrate carrier material, such as a honeycomb-type carrier member, which is sufficiently porous to permit the passage of the gas stream being treated.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

"Rich gaseous streams" including rich exhaust streams mean gas streams that have a $\lambda<1.0$.

"Rich periods" refer to periods of exhaust treatment where the exhaust gas composition is rich, i.e., has a $\lambda<1.0$.

"Rare earth metal components" refer to one or more oxides of the lanthanum series defined in the Periodic Table of Elements, including lanthanum, cerium, praseodymium and neodymium. Rare earth metal components can include at least one rare earth metal selected from Ce, Pr, Nd, Eu, Nb, Sm, Yb, and La.

"Alkaline earth component" refers to one or more chemical elements defined in the Periodic Table of Elements, including beryllium (Be), magnesium (Mg), calcium (Ca), strontium (Sr), barium (Ba), and radium (Ra).

"Alkali metal component" refers to one or more chemical elements defined in the Periodic Table of Elements, including lithium (Li), sodium (Na), potassium (K), rubidium (Rb), cesium (Cs), and francium (Fr).

One or more embodiments are directed to selective catalytic reduction catalysts. The catalysts comprise an 8-ring small pore molecular sieve promoted with iron. The catalyst is effective to catalyst the selective catalytic reduction of nitrogen oxides in the presence of a reductant at temperatures in the range of 200° and 600° C. The molecular sieve having the 8-ring pore openings and double-six ring secondary building units, for example, those having the following structure types: AEI, AFT, AFX, CHA, EAB, ERI, KFI, LEV, SAS, SAT, and SAV. According to one or more embodiments, it will be appreciated that by defining the molecular sieves by their structure type, it is intended to include the structure type and any and all isotypic framework materials such as SAPO. ALPO and MeAPO materials having the same structure type.

In more specific embodiments, reference to an aluminosilicate zeolite structure type limits the material to zeolites that do not include phosphorus or other metals substituted in the framework. Of course, aluminosilicate zeolites may be subsequently ion-exchanged with one or more promoter metals such as iron, copper, cobalt, nickel, manganese, cerium, alkaline earth components or platinum group metals. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. In one or more embodiments, aluminosilicate zeolites have a silica to alumina mole ratio of 5 to 100, and in specific embodiments, 10 to 50, and in more specific embodiments 15-40.

In general, the SCR catalyst based on an 8-ring small pore molecular sieve promoted with iron should exhibit comparable $NO_x$ conversion activity with the catalysts of the state of the art. In general, the catalyst should exhibit good $NO_x$ conversion activity ($NO_x$ conversion>50% over the range of 350° C. to 600° C. The $NO_x$ activity is measured under steady state conditions at maximum $NH_3$-slip conditions in a gas mixture of 500 ppm NO, 500 ppm $NH_3$, 10% $O_2$, 5% $H_2O$, balance $N_2$ at a volume-based space velocity of 80,000 $h^{-1}$.

As used herein, the term "$Na^+$-form of chabazite" refers to the calcined form of this zeolite without any ion exchange. In this form, the zeolite generally contains a mixture of $Na^+$ and $H^+$ cations in the exchange sites. The fraction of sites occupied by $Na^+$ cations varies depending on the specific zeolite batch and recipe.

A molecular sieve can be zeolitic—zeolites—or non-zeolitic, and zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula: $(Ca, Na_2, K_2, Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a non-zeolitic molecular sieve having the chabazite crystal structure, silicoaluminophosphate 34 (SAPO-34), is described in U.S. Pat. No. 4,440,871 and No. 7,264,789, which are hereby incorporated by reference. A method of making yet another synthetic non-zeolitic molecular sieve having chabazite structure, SAPO-44, is described in U.S. Pat. No. 6,162,415, which is hereby incorporated by reference.

In one or more embodiments, the 8-ring small pore molecular promoted with iron is selected from the group consisting of AEI, AFT, AFX, CHA, EAB, ERI, KFI, LEV, SAS, SAT, and SAV. In a more specific embodiment, the 8-ring small pore molecular sieve promoted with iron can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, and ZYT-6. However, in specific embodiments, the 8-ring small pore molecular sieve will have the aluminosilicate composition, such as SSZ-13 and SSZ-62, which would exclude borosilicate, gallosilicate, MeAPSO, SAPO and MeAPO compositions.

In one or more embodiments, iron-promoted 8-ring small pore molecular sieve has the CHA crystal structure and is selected from the group consisting of aluminosilicate zeolite having the CHA crystal structure, SAPO, ALPO, and MeAPO. In particular, the iron-promoted 8-ring small pore molecular sieve having the CHA crystal structure is an iron-promoted aluminosilicate zeolite having the CHA crystal structure. In a specific embodiment, the iron-promoted 8-ring small pore molecular sieve having the CHA crystal structure will have an aluminosilicate composition, such as SSZ-13 and SSZ-62. In a very specific embodiment, the iron-promoted 8-ring small pore molecular sieve having the CHA crystal structure is SSZ-13.

Wt % Iron:

The iron-promoted 8-ring small pore molecular sieve comprises greater than 5% by weight iron. The Fe content of the 8-ring small pore molecular sieve promoted with iron, calculated as $Fe_2O_3$, in specific embodiments is at least about 5.1 wt. %, and in even more specific embodiments at least about 5.5 or 6 wt. % reported on a volatile-free basis. In even more specific embodiments, the Fe content of the 8-ring small pore molecular sieve promoted with iron, calculated as $Fe_2O_3$, is in the range of from about 5.1 wt. %, to about 15 wt. %, or to about 10 wt. %, more specifically to about 9 wt. %, and even more specifically to about 8 wt. %, in each case based on the total weight of the calcined molecular sieve reported on a volatile free basis. Therefore, in specific embodiments, ranges of the 8-ring small pore molecular sieve promoted with iron, calculated as $Fe_2O_3$, are from about 5.1 to 15, 5.1 to 10, 5.1 to 9, 5.1 to 8, 5.1 to 7, 5.1 to 6, 5.5 to 15, 5.5 to 10, 5.5 to 9, 5.5 to 8, 5.5, 6 to 15, 6 to 10, 6 to 9, and 6 to 8 wt. %. All wt. % values are reported on a volatile free basis.

In one or more embodiments, the iron is exchanged into the 8-ring small pore molecular sieve.

SCR Activity:

In specific embodiments, the 8-ring small pore molecular sieve promoted with iron exhibits an aged $NO_x$ conversion at 350° C. of at least 50% measured at a gas hourly space velocity of 80000 $h^{-1}$. In specific embodiments the 8-ring small pore molecular sieve promoted with iron exhibits an aged $NO_x$ conversion at 450° C. of at least 70% measured at a gas hourly space velocity of 80000 $h^{-1}$. More specifically the aged $NO_x$ conversion at 350° C. is at least 55% and at 450° C. at least 75%, even more specifically the aged $NO_x$ conversion at 350° C. is at least 60% and at 550° C. at least 80%, measured at a gas hourly volume-based space velocity of 80000 $h^{-1}$ under steady state conditions at maximum $NH_3$-slip conditions in a gas mixture of 500 ppm NO, 500 ppm $NH_3$, 10% $O_2$, 5% $H_2O$, balance $N_2$. The cores were hydrothermally aged in a tube furnace in a gas flow containing 10% $H_2O$, 10% $O_2$, balance $N_2$ at a space velocity of 4,000 $h^{-1}$ for 5 h at 750° C.

The SCR activity measurement has been demonstrated in the literature, for example WO 2008/106519.

Sodium Content:

In specific embodiments, the 8-ring small pore molecular sieve promoted with iron has a sodium content (reported as $Na_2O$ on a volatile free basis) of below 2 wt. %, based on the total weight of the calcined molecular sieve. In more specific embodiments, sodium content is below 1 wt. %, even more specifically below 2000 ppm, even more specifically below 1000 ppm, even more specifically below 500 ppm and most specifically below 100 ppm.

Na:Al:

In specific embodiments, the 8-ring small pore molecular sieve promoted with iron has an atomic sodium to aluminum ratio of less than 0.7. In more specific embodiments, the atomic sodium to aluminum ratio is less than 0.35, even more specifically less than 0.007, even more specifically less than 0.03 and even more specifically less than 0.02.

Conventional Zeolite Synthesis of CHA-Type Molecular Sieves

In what may be referred to as a conventional synthesis of an 8-ring small pore molecular sieve having the CHA structure, a source of silica, a source of alumina, and a structure directing agent are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate or sodium aluminate, and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added to the latter directing agent. The reaction mixture is heated in a pressure vessel with stirring to yield the crystalline SSZ-13 product. Typical reaction temperatures are in the range of 100 and 200° C., and in specific embodiments between 135 and 170° C. Typical reaction times are between 1 hr and 30 days, and in specific embodiments, between 10 hours and 3 days.

At the conclusion of the reaction, optionally the pH is adjusted to between 6 and 10, and in specific embodiments, between 7 and 7.5, and the product is filtered and washed with water. Any acid can be used for pH adjustment, and in specific embodiments nitric acid is used. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 850° C. range.

Optionally $NH_4$-Exchange to Form $NH_4$-Chabazite:

Optionally, the obtained alkali metal zeolite is $NH_4$-exchanged to form $NH_4$-Chabazite. The $NH_4$-ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

Synthesis of CHA-Type Zeolites According to Embodiments of the Invention

According to one or more embodiments, methods for the synthesis of selective catalytic reduction catalysts comprising an 8-ring small pore molecular sieve promoted with iron are provided. Particularly, the catalyst comprises iron-promoted SSZ-13. The synthesis of iron-promoted CHA-type zeolites, particularly CHA-type aluminosilicate zeolites such as SSZ-13 and SSZ-62 are provided.

Generally, preparation of the iron-promoted 8-ring small pore molecular sieve starts by calcination of ammonium form zeolite, followed by conventional liquid ion exchange using Fe precursor salt at 60° C. for 2 hours at pH 4.5, which may require a buffer. The resultant product is filtered, washed, air dried or spray dried. In other embodiments, the iron is exchanged directly into a Na form of the molecular sieve using Fe precursor salt at 60° C. for 1-2 hours in the presence of a buffer. The dried product is used to prepare a slurry and is coated onto a ceramic flow-through honeycomb. Alternatively, an in-situ method can be used to prepare the iron-promoted 8-ring small pore molecular sieve. For example, an appropriate concentration of Fe salt solution is added dropwise to a slurry of Hydrogen or ammonium form SSZ-13.

BET:

In specific embodiments, the 8-ring small pore molecular sieve promoted with iron exhibits a BET surface area, determined according to DIN 66131, of at least about 400 $m^2/g$, more specifically of at least about 550 $m^2/g$, even more specifically of at about 650 $m^2/g$. In specific embodiments, the 8-ring small pore molecular sieve promoted with iron exhibits a BET surface area in the range from about 400 to about 750 $m^2/g$, more specifically from about 500 to about 750 $m^2/g$.

In specific embodiments, the crystallites of the calcined the 8-ring small pore molecular sieve promoted with iron have a mean length in the range of from 10 nanometers to 100 micrometers, specifically in the range of from 50 nanometers to 5 micrometers, as determined via SEM. In more specific embodiments, the molecular sieve crystallites have a mean length greater than 0.5 microns or 1 micron, and less than 5 microns.

Shape:

The 8-ring small pore molecular sieve promoted with iron according to embodiments of the invention may be provided in the form of a powder or a sprayed material obtained from above-described separation techniques, e.g. decantation, filtration, centrifugation, or spraying. In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by suitable modifiers well known in the art. By way of example, modifiers such as silica, alumina, zeolites or refractory binders (for example a zirconium precursor) may be used. The powder or the sprayed material, optionally after admixing or coating by suitable modifiers, may be formed into a slurry, for example with water, which is deposited upon a suitable refractory carrier (for example WO 2008/106519).

The 8-ring small pore molecular sieve promoted with iron according to embodiments of the invention may also be provided in the form of extrudates, pellets, tablets or particles of any other suitable shape, for use as a packed bed of particulate catalyst, or as shaped pieces such as plates, saddles, tubes, or the like.

In specific embodiments, the 8-ring small pore molecular sieves are substantially comprised of alumina and silica and have a silica to alumina ratio in the range of about 1 to 1000, and in specific embodiments from 1 to 500, and in more specific embodiments from 5 to 300, 10 to 200, 10 to 100, 10 to 90, 10 to 80, 10 to 70, 10 to 60, 10 to 50, 10 to 40, 10 to 35 and 10 to 30 are within the scope of the invention. In specific embodiments, the 8-ring small pore molecular sieve is iron-promoted SSZ-13 and/or iron-promoted SSZ-62.

In general, the 8-ring small pore molecular sieve promoted with iron described above can be used as a molecular sieve, adsorbent, catalyst, catalyst support or binder thereof. In especially specific embodiments, the material is used as a catalyst.

Moreover, embodiments of the invention relates to a method of catalyzing a chemical reaction wherein the 8-ring small pore molecular sieve promoted with iron according to embodiments of the invention is employed as catalytically active material.

Among others, said catalyst may be employed as a catalyst for the selective reduction (SCR) of nitrogen oxides ($NO_x$); for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes. For applications in oxidation reactions, in specific embodiments an additional precious metal component is added to the copper chabazite (e.g. Pd, Pt).

Therefore, embodiments of the invention also relate to a method for selectively reducing nitrogen oxides ($NO_x$) by contacting a stream containing $NO_x$ with a catalyst containing the 8-ring small pore molecular sieve promoted with iron according to embodiments of the invention under suitable reducing conditions; to a method of oxidizing $NH_3$, in particular of oxidizing $NH_3$ slip in diesel systems, by contacting a stream containing $NH_3$ with a selective catalytic reduction catalyst comprising an 8-ring small pore molecular sieve promoted with iron according to embodiments of the invention under suitable oxidizing conditions; to a method of decomposing of $N_2O$ by contacting a stream containing $N_2O$ with a selective catalytic reduction catalyst comprising an 8-ring small pore molecular sieve promoted with iron according to embodiments of the invention under suitable decomposition conditions; to a method of controlling emissions in Advanced Emission Systems such as Homogeneous Charge Compression Ignition (HCCI) engines by contacting an emission stream with a selective catalytic reduction catalyst comprising an 8-ring small pore molecular sieve promoted with copper and the 8-ring small pore molecular sieve promoted with iron according to embodiments of the invention under suitable conditions; to a fluid catalytic cracking FCC process wherein the selective catalytic reduction catalyst comprising an 8-ring small pore molecular sieve promoted with iron is employed as additive; to a method of converting an organic compound by contacting said compound with a selective catalytic reduction catalyst comprising an 8-ring small pore molecular sieve promoted with iron according to embodiments of the invention under suitable conversion conditions; to a "stationary source" process wherein a catalyst is employed containing the 8-ring small pore molecular sieve promoted with iron according to embodiments of the invention.

In particular, the selective reduction of nitrogen oxides wherein the selective catalytic reduction catalyst comprising an 8-ring small pore molecular sieve promoted with iron according to embodiments of the invention is employed as catalytically active material is carried out in the presence of ammonia or urea. While ammonia is the reducing agent of choice for stationary power plants, urea is the reducing agent of choice for mobile SCR systems. Typically, the SCR system is integrated in the exhaust gas treatment system of a vehicle and, also typically, contains the following main components: selective catalytic reduction catalyst comprising the 8-ring small pore molecular sieve promoted with iron according to embodiments of the invention; a urea storage tank; a urea pump; a urea dosing system; a urea injector/nozzle; and a respective control unit.

Method of Reducing $NO_x$:

Therefore, embodiments of the invention also relate to a method for selectively reducing nitrogen oxides ($NO_x$), wherein a gaseous stream containing nitrogen oxides ($NO_x$), for example exhaust gas formed in an industrial process or operation, and in specific embodiments also containing ammonia and/or urea, is contacted with the selective catalytic reduction catalyst comprising the 8-ring small pore molecular sieve promoted with iron according to embodiments of the invention.

The term nitrogen oxides, $NO_x$, as used in the context of embodiments of the invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a selective catalytic reduction catalyst comprising the 8-ring small pore molecular sieve promoted with iron according to embodiments of the invention or an 8-ring small pore molecular sieve promoted with iron obtainable or obtained according to embodiments of the invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogenous materials may be mentioned.

In especially specific embodiments, a selective catalytic reduction catalyst comprising the 8-ring small pore molecular sieve promoted with iron according to embodiments of the invention or the 8-ring small pore molecular sieve promoted with with iron obtainable or obtained according to embodiments of the invention is used for removal of nitrogen oxides ($NO_x$) from exhaust gases of internal combustion engines, in particular diesel engines, which operate at combustion conditions with air in excess of that required for stoichiometric combustion, i.e., lean.

Therefore, embodiments of the invention also relate to a method for removing nitrogen oxides ($NO_x$) from exhaust gases of internal combustion engines, in particular diesel engines, which operate at combustion conditions with air in excess of that required for stoichiometric combustion, i.e., at lean conditions, wherein a selective catalytic reduction catalyst comprising the 8-ring small pore molecular sieve promoted with iron according to embodiments of the invention or an 8-ring small pore molecular sieve promoted with iron obtainable or obtained according to embodiments of the invention is employed as catalytically active material.

Exhaust Gas Treatment System:

Embodiments of the invention relate to an exhaust gas treatment system comprising an exhaust gas stream optionally containing a reductant such as ammonia, urea and/or hydrocarbon, and in specific embodiments, ammonia and/or urea, and a selective catalytic reduction catalytic article containing the 8-ring small pore molecular sieve promoted with iron, disposed on a substrate, and a second exhaust gas treatment component, for example, a soot filter and a diesel oxidation catalyst.

The soot filter, catalyzed or non-catalyzed, may be upstream or downstream of said catalytic article. The diesel oxidation catalyst in specific embodiments is located upstream of said catalytic article. In specific embodiments, said diesel oxidation catalyst and said catalyzed soot filter are upstream from said catalytic article.

In specific embodiments, the exhaust is conveyed from the diesel engine to a position downstream in the exhaust system, and in more specific embodiments, containing $NO_x$, where a reductant is added and the exhaust stream with the added reductant is conveyed to said catalytic article.

For example, a catalyzed soot filter, a diesel oxidation catalyst and a reductant are described in WO 2008/106519 which is incorporated by reference. In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation catalyst may be provided downstream of the catalytic article to remove any slipped ammonia from the system. In specific embodiments, the AMOX catalyst may comprise a platinum group metal such as platinum, palladium, rhodium or combinations thereof. In more specific embodiment, the AMOX catalyst can include a washcoat containing the 8-ring small pore molecular sieve promoted with iron.

Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a zeolite.

AMOX and/or SCR catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Ion Exchange of Metal:

In order to promote the SCR of oxides of nitrogen, a suitable metal is exchanged into the zeolite material. Suitable metals include, but are not limited to copper, iron, cobalt, nickel, manganese, cerium, platinum, palladium, rhodium and combinations thereof. In specific embodiments, iron is ion exchanged into the zeolite. The metal can be exchanged after manufacture of the zeolite. According to one or more embodiments, at least a portion of the metal can be included in the tailored colloid such that the tailored colloid contains the structure directing agent, a silica source, and alumina source and a metal ion (e.g., copper) source.

For additional promotion of SCR of oxides of nitrogen, a suitable alkaline earth or alkali metal is exchanged into the copper promoted molecular sieve material. Suitable alkaline earth or alkali metals include, but are not limited to, barium, magnesium, beryllium, calcium, strontium, radium, and combinations thereof. In specific embodiments, the alkaline earth or alkali metal component is selected from barium, magnesium, calcium and combinations thereof. In very specific embodiments, barium is exchanged into the copper promoted molecular sieve. The metal can be exchanged after the manufacture of the molecular sieve.

Iron-exchange into to alkali metal or $NH_4$-Chabazite to form metal-Chabazite:

Iron is ion exchanged into alkali metal or NH4 8 ring small pore molecular sieves. In specific embodiments, iron is ion exchanged into alkali metal or $NH_4$-Chabazite to form FeChabazite. According to an embodiment of the present invention, the molecular sieve material (which may be zeolitic material or non-zeolitic material) of the invention is used in a catalytic process, for example, as a catalyst and/or catalyst support, and more specifically as a catalyst. In general, the molecular sieve material of the invention can be used as a catalyst and/or catalyst support in any conceivable catalytic process, wherein processes involving the conversion of at least one organic compound, more specifically of organic compounds comprising at least one carbon-carbon and/or carbon-oxygen and/or carbon-nitrogen bond, more specifically of organic compounds comprising at least one carbon-carbon and/or carbon-oxygen bond, and even more specifically of organic compounds comprising at least one carbon-carbon bond. In particularly specific embodiments of the present invention, the molecular sieve material is used as a catalyst and/or catalyst support in any one or more of methanol-to-olefin (MTO) reactions, ethylene-to-propylene (ETP) reactions, as well as of the co-reaction of methanol and ethylene (CME). The processes involve contacting the compounds with the catalysts according to embodiments of the invention.

According to a further embodiment of the present invention, the molecular sieve material of the invention used in a catalytic process involving the conversion of at least one compound comprising at least one nitrogen-oxygen bond. According to one or more embodiments of the present invention the molecular sieve material is used as a catalyst and/or catalyst support in a selective catalytic reduction (SCR) process for the selective reduction of nitrogen oxides $NO_x$; for the oxidation of $NH_3$, in particular for the oxidation of $NH_3$ slip in diesel systems; for the decomposition of $N_2O$. The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$). According to particularly specific embodiments of the present invention, the molecular sieve material used in a catalytic process involving the conversion of at least one compound comprising at least one nitrogen-oxygen bond comprises Fe. The process can be accomplished by contacting the compound with a catalyst according to an embodiment of the invention.

Therefore, the present invention also relates to a method for selectively reducing nitrogen oxides $NO_x$ by contacting a stream containing $NO_x$ with a catalyst containing the molecular sieve material according to the present invention under suitable reducing conditions; to a method of oxidizing $NH_3$, in particular of oxidizing NH; slip in diesel systems, by contacting a stream containing $NH_3$ with a catalyst containing the molecular sieve material having an LEV-type framework structure according to the present invention under suitable oxidizing conditions; to a method of decomposing of $N_2O$ by contacting a stream containing $N_2O$ with a catalyst containing the molecular sieve material under suitable decomposition conditions; to a method of controlling emissions in Advanced Emission Systems such as Homogeneous Charge Compression Ignition (HCCI) engines by contacting an emission stream with a catalyst containing the molecular sieve material under suitable conditions; to a fluid catalytic cracking FCC process wherein the molecular sieve material is employed as additive; to a method of converting an organic compound by contacting said compound with a catalyst containing the molecular sieve material under suitable conversion conditions; to a "stationary source" process wherein a catalyst is employed containing the molecular sieve material.

Accordingly, embodiments of the present invention also relates to a method for selectively reducing nitrogen oxides $NO_x$, wherein a gaseous stream containing nitrogen oxides $NO_x$, specifically also containing ammonia and/urea, is contacted with the molecular sieve material according to the present invention or the molecular sieve material obtainable or obtained according to the present invention, for example, in the form of a molded catalyst, specifically as a molded catalyst wherein the molecular sieve material is deposited on a suitable refractory carrier, still more specifically on a "honeycomb" carrier.

The nitrogen oxides which are reduced using a catalyst containing the molecular sieve material obtainable or obtained according to embodiments of the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogenous materials may be mentioned.

In specific embodiments, the molecular sieve material or the molecular sieve material obtainable or obtained according to embodiments of the present invention is used as a molded catalyst, still more specifically as a molded catalyst wherein the molecular sieve material is deposited on a suitable refractory carrier, still more specifically on a "honeycomb" carrier, for the selective reduction of nitrogen oxides $NO_x$, i.e. for selective catalytic reduction of nitrogen oxides. In particular, the selective reduction of nitrogen oxides wherein the molecular sieve material according to an embodiment of the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components; SCR catalyst containing the molecular sieve material according to an embodiment of the present invention; a urea storage tank; a urea pump; a urea dosing system; a urea injector/nozzle; and a respective control unit.

More specific embodiments pertain to the use of a catalyst containing the molecular sieve material according to the present invention or the molecular sieve material obtainable or obtained according to the inventive process for removal of nitrogen oxides $NO_x$ from exhaust gases of internal combustion engines, in particular diesel engines, which operate at combustion conditions with air in excess of that required for stoichiometric combustion, i.e. in a lean operation mode.

Therefore, embodiments the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the molecular sieve material according to the present invention or the molecular sieve material obtainable or obtained according to the present invention is employed as catalytically active material.

Embodiments of the present invention therefore relates to the use of the 8-ring small pore molecular sieve promoted with iron of the invention, in particular in the field of catalysis and/or in the treatment of exhaust gas, wherein said exhaust gas treatment comprises industrial and automotive exhaust gas treatment. In these and other applications, the 8-ring small pore molecular sieve promoted with iron of the present invention can by way of example be used as a molecular sieve, catalyst, and/or catalyst support.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Preparation of Catalyst Samples

Example 1

Preparation of Fe-CHA Samples

Iron is incorporated into the sodium CHA through Fe-ion exchange at about 80° C. for about 2 hours at pH about 4. The mixture is then washed with deionized water, filtered, and vacuum/air dried. Samples were prepared targeting 1 (Example 1A), 2 (Example 1B), 3 (Example 1C), 5 (Example 1D) and 10 (Example 1E) wt. % Fe loading. Washcoats were prepared by mixing water and water and Fe zeolite to generate a target 45% by weight solids slurry. The slurry is homogenous. The mixture is mixed well. The particle size is checked to ensure that $D_{90}$ is less than 12 microns. Based on the total solids content binder is added. The mixture is mixed well. The physical properties were checked (solid content, pH, particle size/PSD, viscosity). If the particle size $D_{90}$ was greater than 10 microns, the slurry was milled to about 8-10 microns.

The slurry was coated onto 1"D×3"L cellular ceramic cores, having a cell density of 400 cpsi (cells per square inch) and a wall thickness of 6.5 mil. The coated cores were dried at 110° C. for 3 hours and calcined at 400° C. for 1 hour. The coating process was repeated once to obtain a target washcoat loading of 2.4 g/in³. If the slurry is not coatable, it is diluted to make it coated (minimum dilution).

Example 2

In Situ Fe-Exchanged CHA

Alternatively, an in-situ method can be used to prepare the iron-promoted 8-ring small pore molecular sieve. For example, an appropriate concentration of Fe salt solution is added drop-wise to a mixing slurry of Hydrogen or ammonium form SSZ-13. The mixture is rolled overnight and milled to appropriate particle size can washcoated on honeycomb substrate as described in Example 1. Example 2 contained 1% iron by weight.

Example 3

Testing

Nitrogen oxides selective catalytic reduction (SCR) efficiency and selectivity of a fresh catalyst core was measured by adding a feed gas mixture of 500 ppm of NO, 500 ppm of $NH$, 10% 0, 5% $H_2O$, balanced with $N_2$ to a steady state reactor containing a 1"D×3"L catalyst core. The reaction was carried at a space velocity of 80,000 $hr^{-1}$ across a 150° C. to 460° C. temperature range.

Hydrothermal stability of the catalyst was measured by hydrothermal aging of the catalyst core in the presence of 10% $H_2O$ at 750° C. for 5 hours, followed by measurement of the nitrogen oxides SCR efficiency and selectivity by the same process as outlined above for the SCR evaluation on a fresh catalyst core.

FIG. 1 shows $NO_x$ conversion for Example 1A versus Example 2, each with 1 wt. % iron.

Table 1 shows the results.

TABLE 1

| EXAMPLE # | TEMPERATURE (° C.) | $NO_x$ CONVERSION (%) |
|---|---|---|
| 1 (Cu-CHA) | 200 | 10 |
|  | 250 | 30 |
|  | 300 | 60 |
|  | 450 | 82 |
|  | 500 | 82 |
|  | 600 | 79 |

The results show stable high temperature performance of Fe-SSZ13 is observed >400° C. Conventional liquid ion exchanged Fe-SSZ13 shows higher performance at low temperatures.

Example 4

Testing of Varying Loadings of Fe

Figure 2:
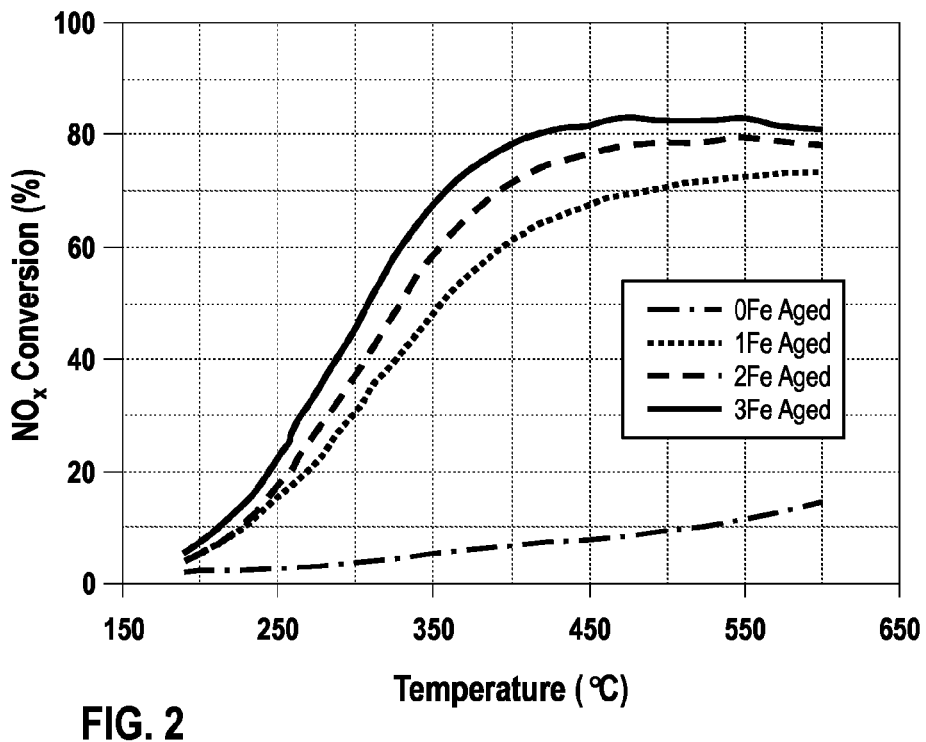
FIG. 2 shows the $NO_x$ conversion versus temperature for SSZ-13 having varying Fe loadings.
Figure 3:
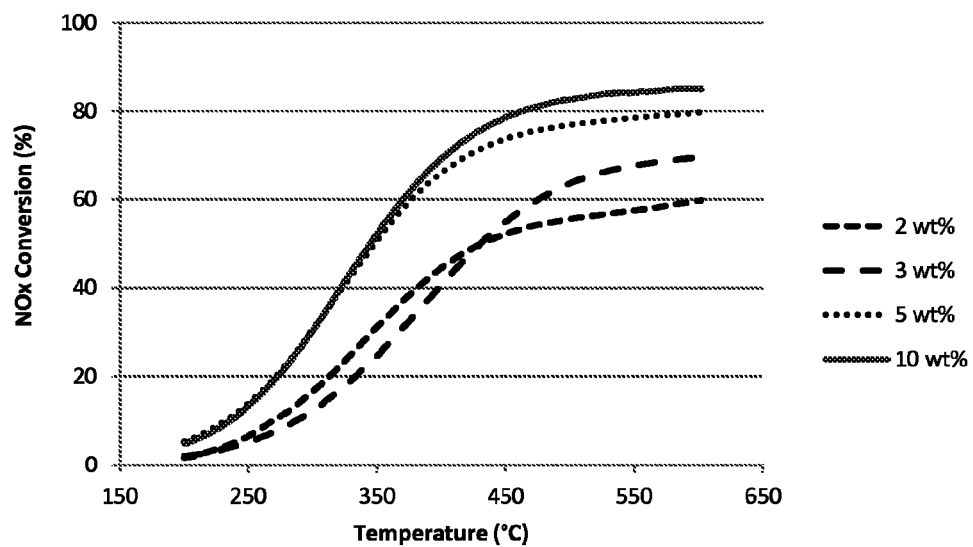
FIG. 3 shows NOx conversion versus temperature for SSZ-13 having varying Fe loadings.

FIG. 2 compares the $NO_x$ conversion for Examples 1A, 1B and 1C, respectively containing 1, 2 and 3 wt.° % iron. The results illustrate that high temperature performance increases with Fe loading.

Example 5

Further Testing of Varying Loadings

Figure 4:
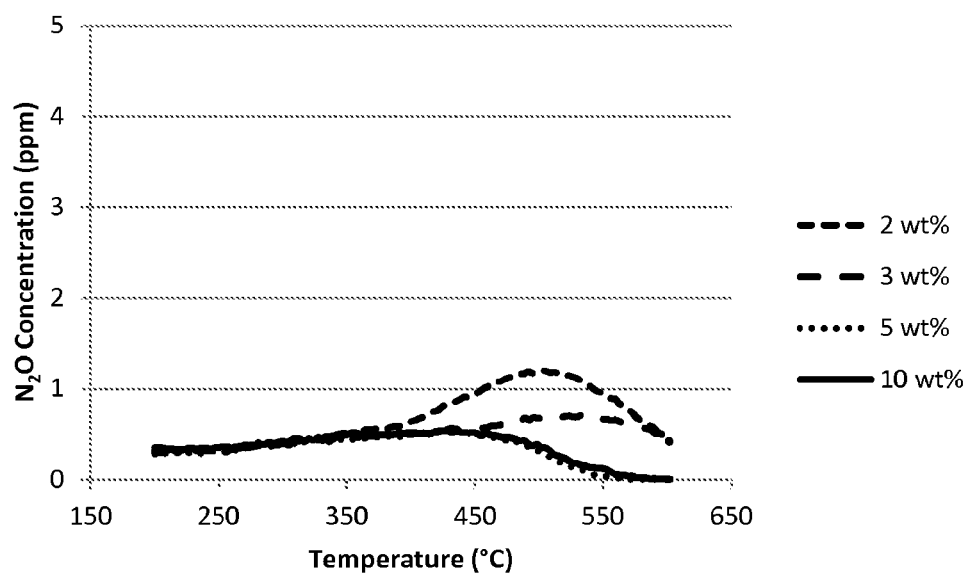
FIG. 4 shows $N_2O$ generation versus temperature for SSZ-13 having varying Fe loadings.

Examples 1B (2 wt. %), 1C (3 wt. %), 1D (5 wt. %) and 1E (10 wt. %) Fe loading were tested for $NO_x$ conversion and $N_2O$ concentration (or $N_2O$ make) exiting the catalyst. $N_2O$ is a greenhouse gas, and it is desirable that N2O exiting the catalyst is as low as possible. FIG. 4 shows NOx conversion results. Samples containing 5% and 10% showed significantly better NOx conversion at the lower temperature region of 200° C. to 350° C., as well as the high temperature region of 350° C. 5o 600° C. At 550° C., the NOx conversion of the 10% Fe-loaded sample was several percent higher.

FIG. 4 shows the dramatic improvement in the reduction in N2O for Examples 1D and 1E, including 5% and higher Fe.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A selective catalytic reduction catalyst comprising an 8-ring small pore molecular sieve promoted with greater than 5 wt. % iron so that the catalyst is effective to catalyze the selective catalytic reduction of nitrogen oxides in the presence of a reductant at temperatures between 200° and 600° C.

2. The catalyst of claim 1, wherein the iron-promoted 8-ring small pore molecular sieve is selected from the group consisting of iron-promoted zeolite having a structure type selected from AEI, AFT, AFX, CHA, EAB, ERI, KFI, LEV, SAS, SAT, and SAV.

3. The catalyst of claim 2, wherein the iron-promoted 8-ring small pore molecular sieve has the CHA crystal structure.

4. The catalyst of claim 3, wherein the iron-promoted 8-ring small pore molecular sieve having the CHA crystal structure is selected from an aluminosilicate zeolite, a borosilicate, a gallosilicate, a SAPO, an ALPO, a MeAPSO, and a MeAPO.

5. The catalyst of claim 4, wherein the iron-promoted 8-ring small pore molecular sieve is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

6. The catalyst of claim 3, wherein the 8-ring small pore molecular sieve having the CHA structure is an aluminosilicate zeolite having the CHA crystal structure.

7. The catalyst of claim 6, wherein the aluminosilicate zeolite having the CHA crystal structure is selected from iron-promoted SSZ-13 and iron-promoted SSZ-62.

8. The catalyst of claim 7, wherein the zeolite has a silica to alumina ratio in the range of 5 and 100.

9. The catalyst of claim 8, wherein the zeolite has a silica to alumina ratio in the range of 10 and 50.

10. The catalyst of claim 1, comprising iron in the range of 5.1 wt. % to 10 wt. %, calculated as $Fe_2O_3$.

11. The catalyst of claim 7, comprising iron in the range of t 5.1 wt. % to 10 wt. %, calculated as $Fe_2O_3$.

12. The catalyst of claim 8, comprising iron in the range of 5.1 wt. % to 10 wt. %, calculated as $Fe_2O_3$.

13. A catalytic article comprising the catalyst of claim 1 in a washcoat deposited on a honeycomb substrate.

14. The catalytic article of claim 13, wherein the honeycomb substrate comprises a wall flow filter substrate.

15. The catalytic article of claim 13, wherein the honeycomb substrate comprises a flow through substrate.

16. An exhaust gas treatment system comprising the catalytic article of claim 13 disposed downstream from a diesel engine and an injector that adds a reductant to an exhaust gas stream from the engine.

17. A method for selectively reducing nitrogen oxides, the method comprising contacting a gaseous stream containing nitrogen oxides with a selective catalytic reduction catalyst comprising an 8-ring small pore molecular sieve promoted with greater than 5 wt. % iron to catalyze the selective catalytic reduction of the nitrogen oxides in the presence of a reductant at temperatures between 200° and 600° C.

18. The method of claim 17, wherein the 8-ring small pore molecular sieve promoted with iron is selected from the group consisting of AEI, AFT, AFX, CHA, EAB, ERI, KFI, LEV, SAS, SAT, and SAV.

19. The method of claim 18, wherein the 8-ring small pore molecular sieve promoted with iron has the CHA crystal structure.

20. The method of claim 19, wherein the 8-ring small pore molecular sieve promoted with iron and having the CHA crystal structure is selected from the group consisting of aluminosilicate zeolite, SAPO, ALPO and MeAPO.

* * * * *